(12) United States Patent
Sham

(10) Patent No.: US 10,454,576 B2
(45) Date of Patent: Oct. 22, 2019

(54) UAV NETWORK

(71) Applicant: Wellen Sham, Taipei (TW)

(72) Inventor: Wellen Sham, Taipei (TW)

(73) Assignee: Wellen Sham, Taipei (TW)

( * ) Notice: Subject to any disclaimer, the term of this patent is extended or adjusted under 35 U.S.C. 154(b) by 0 days.

(21) Appl. No.: 15/341,797

(22) Filed: Nov. 2, 2016

(65) Prior Publication Data

US 2017/0195048 A1   Jul. 6, 2017

Related U.S. Application Data

(63) Continuation of application No. 62/274,112, filed on Dec. 31, 2015.

(51) Int. Cl.
| | | |
|---|---|---|
| *H04B 10/112* | (2013.01) | |
| *H04B 7/185* | (2006.01) | |
| *H04B 7/155* | (2006.01) | |
| *H04W 84/00* | (2009.01) | |

(52) U.S. Cl.
CPC ......... *H04B 10/1129* (2013.01); *H04B 7/155* (2013.01); *H04B 7/18506* (2013.01); *H04W 84/005* (2013.01)

(58) Field of Classification Search
CPC ................ H04B 10/1129; H04B 7/18506
See application file for complete search history.

(56) References Cited

U.S. PATENT DOCUMENTS

| | | |
|---|---|---|
| 6,958,676 B1 | 10/2005 | Morgan et al. |
| 7,885,548 B1 | 2/2011 | Nelson et al. |
| 8,503,941 B2 | 8/2013 | Erdos et al. |
| 8,527,146 B1 | 9/2013 | Jackson et al. |
| 8,717,436 B2 | 5/2014 | Heminghous et al. |
| 8,970,694 B2 | 3/2015 | Dunkel et al. |

(Continued)

FOREIGN PATENT DOCUMENTS

WO   2010/089738 A2   8/2010

OTHER PUBLICATIONS

European Search Report for EP 16 20 6286 dated May 24, 2017, 7 pages.

(Continued)

*Primary Examiner* — Nathan M Cors
(74) *Attorney, Agent, or Firm* — Kilpatrick Townsend & Stockton LLP

(57) ABSTRACT

Embodiments are provided for facilitating an unmanned aerial vehicle (UAV) network. The UAV network in accordance with the disclosure can comprise multiple UAVs, ground processing stations, and/or any other components. A particular UAV in the network can carry payloads consisting of optical image sensors, processing devices, communication systems, and/or any other components. An individual UAV in the network can comprise photovoltaic cells capable of absorbing solar energy. Embodiments are provided for converting the solar energy to electricity for providing power to payloads aboard the UAV and as well as charging a battery aboard the UAV. In certain embodiments, the UAV can fly up to 65,000 feet and can cover as much as 500 km in range. One motivation of the present disclosure is to "outsource" some or entire information processing by an UAV to existing infrastructure, such as the ground processing station.

16 Claims, 10 Drawing Sheets

(56) References Cited

U.S. PATENT DOCUMENTS

| | | |
|---|---|---|
| 9,022,324 B1 | 5/2015 | Abhyanker |
| 9,056,676 B1 | 6/2015 | Wang |
| 9,070,289 B2 | 6/2015 | Saund et al. |
| 9,148,215 B1 | 9/2015 | Bonawitz |
| 9,164,506 B1 | 10/2015 | Zang |
| 9,170,117 B1 | 10/2015 | Abuelsaad et al. |
| 9,307,383 B1 | 4/2016 | Patrick |
| 9,313,242 B2 | 4/2016 | Mann et al. |
| 9,313,667 B1 | 4/2016 | Daoura |
| 9,466,161 B2 | 10/2016 | Ricci |
| 9,489,839 B2 | 11/2016 | Nerayoff et al. |
| 9,590,298 B1 | 3/2017 | Buchmueller et al. |
| 9,786,165 B2 | 10/2017 | Sham |
| 9,800,321 B2 | 10/2017 | Sham |
| 9,826,256 B2 | 11/2017 | Sham |
| 9,955,115 B2 | 4/2018 | Sham |
| 10,073,449 B1 | 9/2018 | Sait |
| 10,097,862 B2 | 10/2018 | Sham |
| 2003/0200398 A1 | 10/2003 | Harris |
| 2007/0080813 A1 | 4/2007 | Melvin |
| 2007/0250260 A1 | 10/2007 | Ariyur et al. |
| 2008/0018730 A1 | 1/2008 | Roth |
| 2008/0024985 A1 | 1/2008 | Lee et al. |
| 2008/0249857 A1 | 10/2008 | Angell et al. |
| 2010/0031284 A1 | 2/2010 | Miyaki |
| 2010/0036717 A1 | 2/2010 | Trest |
| 2010/0085236 A1 | 4/2010 | Franceschini et al. |
| 2010/0179878 A1 | 7/2010 | Dawson et al. |
| 2010/0293033 A1 | 11/2010 | Hall et al. |
| 2011/0292160 A1 | 12/2011 | Shitrit |
| 2012/0054028 A1 | 3/2012 | Tengler et al. |
| 2012/0089462 A1 | 4/2012 | Hot |
| 2012/0122418 A1 | 5/2012 | Hicks, III |
| 2013/0210461 A1 | 8/2013 | Moldavsky et al. |
| 2013/0273839 A1 | 10/2013 | Breshears |
| 2013/0317680 A1 | 11/2013 | Yamamura et al. |
| 2013/0328997 A1 | 12/2013 | Desai |
| 2014/0241239 A1* | 8/2014 | Chang ................ H04B 7/18506 370/316 |
| 2014/0309806 A1 | 10/2014 | Ricci |
| 2014/0309813 A1 | 10/2014 | Ricci |
| 2014/0336848 A1 | 11/2014 | Saund et al. |
| 2014/0344062 A1 | 11/2014 | LaMont |
| 2015/0049192 A1 | 2/2015 | Hooton |
| 2015/0062339 A1 | 3/2015 | Ostrom |
| 2015/0070516 A1 | 3/2015 | Shoemake et al. |
| 2015/0092020 A1 | 4/2015 | Vaughn |
| 2015/0127460 A1 | 5/2015 | Daub et al. |
| 2015/0134143 A1 | 5/2015 | Willenborg |
| 2015/0140954 A1 | 5/2015 | Maier et al. |
| 2015/0146579 A1* | 5/2015 | Teller .................... H04W 40/02 370/259 |
| 2015/0204974 A1 | 7/2015 | Pillay |
| 2015/0257081 A1* | 9/2015 | Ramanujan ............. H04L 45/24 370/329 |
| 2015/0280810 A1* | 10/2015 | Beals ................. H04B 7/18521 455/13.1 |
| 2015/0325268 A1 | 11/2015 | Berger et al. |
| 2015/0353206 A1 | 12/2015 | Wang |
| 2016/0019458 A1 | 1/2016 | Kaufhold |
| 2016/0078759 A1 | 3/2016 | Nerayoff et al. |
| 2016/0116291 A1 | 4/2016 | Chien |
| 2016/0199034 A1 | 7/2016 | Labyed et al. |
| 2016/0271796 A1 | 9/2016 | Babu |
| 2016/0272196 A1 | 9/2016 | Hocking et al. |
| 2016/0285864 A1 | 9/2016 | Canavor et al. |
| 2016/0363929 A1 | 12/2016 | Clark et al. |
| 2017/0019504 A1 | 1/2017 | Ota et al. |
| 2017/0039424 A1 | 2/2017 | Nerayoff et al. |
| 2017/0041763 A1 | 2/2017 | Jalali |
| 2017/0193556 A1 | 7/2017 | Sham |
| 2017/0193820 A1 | 7/2017 | Sham |
| 2017/0195038 A1 | 7/2017 | Sham |
| 2017/0195627 A1 | 7/2017 | Sham |
| 2017/0195694 A1 | 7/2017 | Sham |
| 2017/0353229 A1 | 12/2017 | Sham |
| 2018/0033298 A1 | 2/2018 | Sham |
| 2018/0063554 A1 | 3/2018 | Sham |

OTHER PUBLICATIONS

European Search Report for EP 16 20 6298 dated May 24, 2017, 7 pages.
European Search Report for EP 16 20 6338 dated Jun. 6, 2017, 6 pages.
European Search Report for EP 16 20 6345 dated May 29, 2017, 8 pages.
European Search Report for EP 16 20 6351 dated Jun. 9, 2017, 6 pages.
U.S. Appl. No. 15/341,809, filed Nov. 2, 2016, Non-Final Rejection dated Dec. 30, 2016, all pages.
U.S. Appl. No. 15/341,809, filed Nov. 2, 2016, Notice of Allowance dated Jun. 16, 2017, all pages.
U.S. Appl. No. 15/341,813, filed Nov. 2, 2016, Non-Final Rejection dated Jan. 31, 2017, all pages.
U.S. Appl. No. 15/341,818, filed Nov. 2, 2016, Non-Final Rejection dated Jan. 27, 2017, all pages.
U.S. Appl. No. 15/341,818, filed Nov. 2, 2016, Non-Final Rejection dated Aug. 10, 2017, all pages.
U.S. Appl. No. 15/341,818, filed Nov. 2, 2016, Final Rejection dated Aug. 10, 2017, all pages.
U.S. Appl. No. 15/341,824, filed Nov. 2, 2016, Notice of Allowance dated Jul. 18, 2017, all pages.
U.S. Appl. No. 15/341,831, filed Nov. 2, 2016, Non-Final Rejection dated Jan. 13, 2017, all pages.
U.S. Appl. No. 15/341,831, filed Nov. 2, 2016, Notice of Allowance dated May 23, 2017, all pages.
European Search Report for EP 16 20 6328 dated May 29, 2017, 6 pages.
U.S. Appl. No. 15/341,824, filed Nov. 2, 2016, Non-Final Rejection dated Mar. 16, 2017, all pages.
U.S. Appl. No. 15/341,813, filed Nov. 2, 2016, Final Rejection dated Aug. 29, 2017, all pages.
Notice of Allowance dated Jun. 7, 2018 in the corresponding (U.S. Appl. No. 15/794,529).
U.S. Appl. No. 15/341,809, "Supplemental Notice of Allowance", dated Jul. 13, 2017, 2 pages.
U.S. Appl. No. 15/341,813, "Notice of Allowance", dated Dec. 13, 2017, 6 pages.
U.S. Appl. No. 15/341,818, "Final Office Action", dated Aug. 10, 2018, 31 pages.
U.S. Appl. No. 15/341,818, "Non-Final Office Action", dated Jan. 9, 2018, 21 pages.
U.S. Appl. No. 15/341,818, "Non-Final Office Action", dated Dec. 26, 2018, 30 pages.
U.S. Appl. No. 15/685,465, "Non-Final Office Action", dated Jan. 10, 2019, 12 pages.
U.S. Appl. No. 15/717,483, "Non-Final Office Action", dated Nov. 2, 2018, 7 pages.
U.S. Appl. No. 15/717,483, "Notice of Allowance", dated Mar. 14, 2019, 9 pages.
U.S. Appl. No. 15/926,486, "Ex Parte Quayle Action", Jan. 28, 2019, 9 pages.

* cited by examiner

UAV NETWORK

CROSS-REFERENCE TO RELATED APPLICATIONS

The present application claims priority to U.S. Provisional Patent Application No. 62/274,112, filed on Dec. 31, 2015, the disclosure of which is hereby incorporated by reference in its entirety for all purposes.

BACKGROUND

The present disclosure relates to facilitating telecommunications through unmanned aerial vehicle, and more specifically to facilitating telecommunications through self-sustaining unmanned aerial vehicle.

High-altitude long endurance solar powered aircraft concepts have been proposed for some time. Such vehicles provide significant potential benefits. For example, weather conditions, such as wind strengths and turbulence levels, are reduced between around 50,000 to 100,000 feet altitude. High-altitude long endurance aircraft that flies above 50,000 feet can thus avoid severe weather conditions. This allows extended fly time. Additionally, this altitude range is above normal aviation authority certification needs, and large areas of the planet can be observed at this range, with the distance to the horizon being over 500 km. High-altitude long endurance aircraft flying in this altitude range is therefore suitable for aerial surveys, surveillance and emergency communications in disaster recovery situations, and/or any other applications.

An unmanned aerial vehicle (UAV), commonly known as a drone and also referred by several other names, is an aircraft without a human pilot aboard. The flight of UAVs may be controlled either autonomously by onboard computers or by the remote control of a pilot on the ground or in another vehicle. UAVs have mostly found military and special operation applications, but also are increasingly finding uses in civil applications, such as policing, surveillance and firefighting, and nonmilitary security work, such as inspection of power or pipelines. UAVs are adept at gathering an immense amount of visual information and displaying it to human operators. However, it can take a great deal of time and manpower to interpret the information gathered by UAVs. In many cases, the information gathered by UAVs is misinterpreted by human operators and analysts who have a limited time window in which to interpret the information.

Most conventional UAV systems typically include a propulsion system, a navigation and control system, and payloads. Each of these need electric power to sustain their functionalities. Most commercially available UAVs are battery powered with limited fly time at one battery charge. Typically, most conventional UAVs can continuously stay in the air for no more than a few hours. Thus, effective power sources need to be developed for a conventional UAV to ensure the sustained functionality of various systems and payloads onboard the UAV.

SUMMARY

Embodiments are provided for facilitating an unmanned aerial vehicle (UAV) network. The UAV network in accordance with the disclosure can comprise multiple UAVs, ground processing stations, and/or any other components. A particular UAV in the network can carry payloads consisting of optical image sensors, processing devices, communication systems, and/or any other components. An individual UAV in the network can comprise photovoltaic cells capable of absorbing solar energy. Embodiments are provided for converting the solar energy to electricity for providing power to payloads aboard the UAV and as well as charging a battery aboard the UAV. In certain embodiments, the UAV can fly up to 65,000 feet and can cover as much as 500 km in range. One motivation of the present disclosure is to "outsource" some or entire information processing by an UAV to existing infrastructure, such as the ground processing station.

In accordance with the disclosure, a communication channel can be established between two UAVs in the network through communication hardware onboard the UAVs. In certain embodiments, the communication channel can be established through a controller. The controller can be provided by a ground processing station or can be provided by a UAV in the network. In certain implementations, the controllers can be configured to manage network requirements, to manage connections among the UAVs in the network as well as the ground processing station. Through the one or more controllers, data path can be established between any two UAVs in the network, and/or between any UAV and a processing station.

In certain embodiments, the communication hardware carried by or installed on an individual UAV in the network can include a Free-space optical (FSO) communication unit. The FSO unit can comprise one or more of an optical transceiver. The optical transceiver can be configured to transmit optical beam to an FSO unit of another UAV or to an FSO unit of a ground processing station.

Other objects and advantages of the invention will be apparent to those skilled in the art based on the following drawings and detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
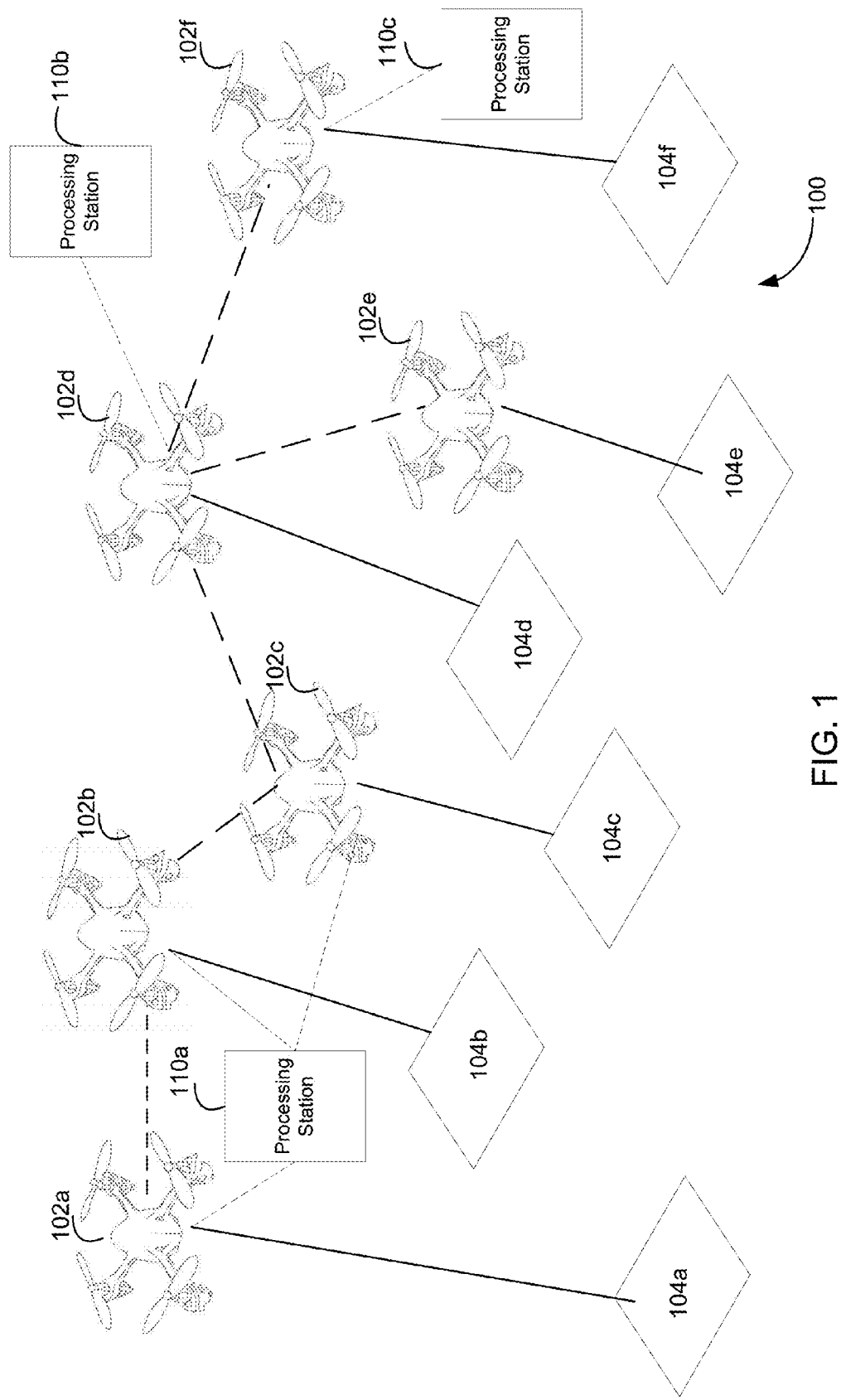
FIG. 1 illustrates an exemplary UAV network in accordance with the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Various specific embodiments of the present disclosure will be described below with reference to the accompanying drawings constituting a part of this specification. It should be understood that, although structural parts and components of various examples of the present disclosure are described by using terms expressing directions, e.g., "front", "back", "upper", "lower", "left", "right" and the like in the present disclosure, these terms are merely used for the purpose of convenient description and are determined on the basis of exemplary directions displayed in the accompanying drawings. Since the embodiments disclosed by the present disclosure may be set according to different directions, these terms expressing directions are merely used for describing rather than limiting. Under possible conditions, identical or similar reference numbers used in the present disclosure indicate identical components.

UAVs are well suited for applications where the payload consists of optical image sensors such as cameras with powerful lightweight sensors suited for a variety of commercial applications such as surveillance, video conferencing, vehicle positioning, and/or any other applications. A UAV in accordance with the disclosure can collect multi-spectral imagery of any object in an area covered the UAV. In certain embodiments, the UAV can fly up to 65,000 feet and can cover as much as 500 km in range. However, as mentioned above, such applications will require a large amount of information to be collected and processed. Onboard processing of such information for the commercial applications will require large processing power, which in turn requires heavy payloads and power. One motivation of the present disclosure is to "outsource" some or entire processing of such information to existing infrastructure, such as processing stations on the ground. Embodiments provide communication technologies to create a UAV network that comprises multiple UAVs, ground processing stations, and/or any other components. The UAVs in the network can be equipped with communication hardware to enable the UAVs to communicate with each other and as well as ground processing stations. The network can be dynamically controlled by one or more controllers. In certain implementations, the controllers can be configured to manage network requirements, to manage connections among the UAVs in the network as well as the ground processing station. Through the one or more controllers, data path can be established between any two UAVs in the network, and/or between any UAV and a processing station.

FIG. 1 illustrates an exemplary UAV network 100 in accordance with the disclosure. As shown, the UAV network 100 can comprise multiple UAVs, such as UAVs 102a-f. It should be understood the UAV network 100, in certain embodiments, can comprise hundreds, thousands, or even tens of thousands of UAVs 102. The individual UAVs 102 in network 100, such as UAV 102a, can fly above the ground, between 50,000 to 65,000 feet altitude. However, this is not intended to be limiting. In some examples, some or all of the UAVs 102 in the network 100 can fly at hundreds or thousands feet above the ground. As shown, the individual UAVs 102 in the network 100 can communicate with each other through communication hardware carried by or installed on UAVs 102. For example, the communication hardware onboard a UAV 102 can include an antenna, a high frequency radio transceiver, an optical transceiver, and/or any other communication components for long range communications. A communication channel between any two given UAVs 102, for example, UAV 102c and UAV 102d, can be established. In this way, network 100 can be set up as an ad-hoc network.

Figure 2A:
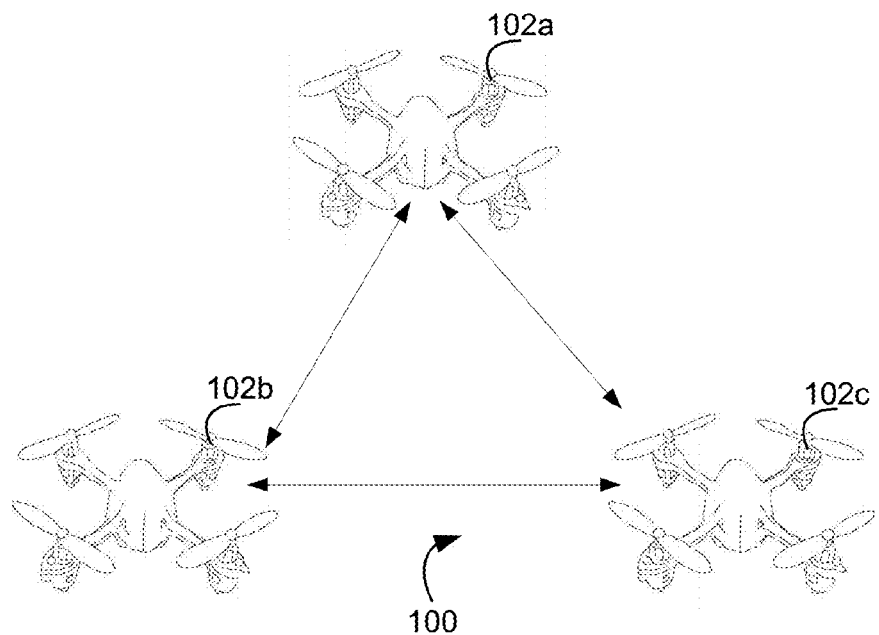
FIG. 2A illustrates a first example of communication channels established between UAVs in the network.

One way of establishing a communication channel between any two given UAVs is to have them autonomously establish the communication channel through the communication hardware onboard the two given UAVs 102. This is illustrated FIG. 2A. In this example, UAVs 102a, 102b and 102c are neighboring UAVs such that they cover neighboring areas or grids on the ground. They can be configured to communicate with each other once they are within a threshold distance. The threshold distance can be the maximum communication range of the transceivers onboard the UAVs 102a, 102b, and 102c. In this way, UAVs 102a, 102b, and 102c can send data to each other without an access point.

Figure 2B:
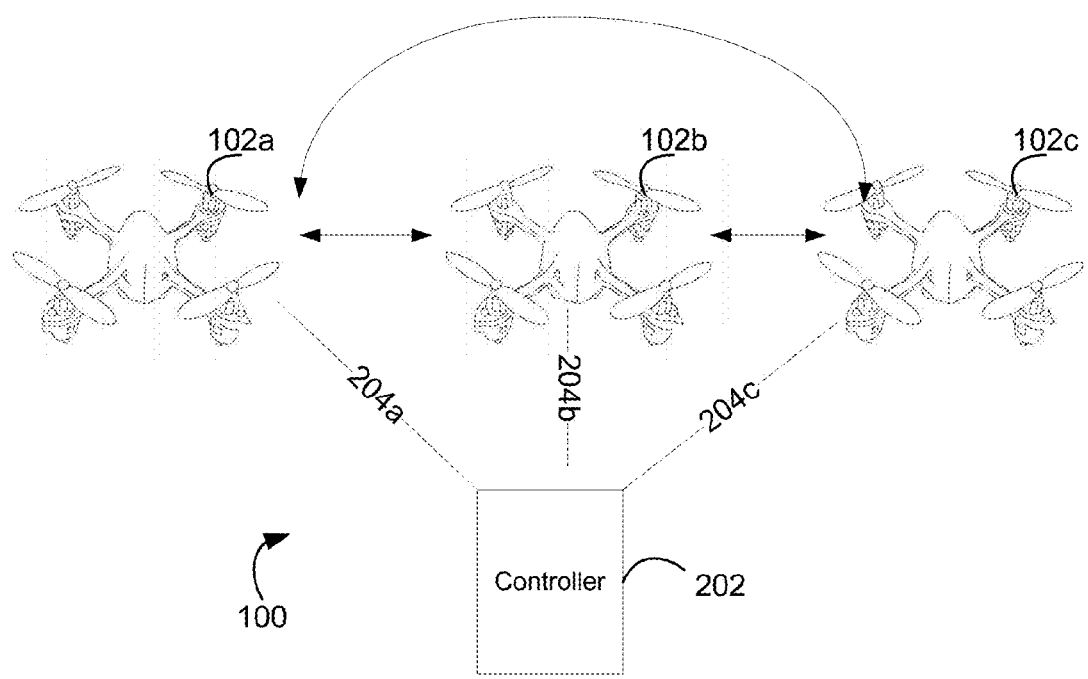
FIG. 2B illustrates a second example of communication channels established between UAVs in the network.

Another way of establishing a communication channel between any two given UAVs 102 is to have them establish communication channel through a controller. As used herein, a controller may be referred to as a piece of hardware and/or software configured to control communications within network 100. This is illustrated in FIG. 2B. The controller 202 shown in FIG. 2B can be provided by a ground processing center, such as ground processing center 110a, 110b, or 110c. For instance, controller 202 can be implemented by a computer server housed in a ground processing center 110. In certain embodiments, the controller 202 can be provide by a UAV 102 in the network 100. For instance, a given UAV 102, such as a unmanned helicopter or a balloon, in the network 102 can carry payloads including one or more of a processor configured to implement the controller 202. In any case, the controller 202 can be configured to determine network requirements based on an application supported by network 100, and/or to perform any other operations. As shown, the communication channel between UAVs 102a, 102b, and/or UAVs 102c as established by the controller 202 can be a direct data path between the UAVs 102. In implementations, control signals can be transmitted via respective control link 204, such as control link 204a, 204b or 204c from the controller 202 to the UAVs 102a, 102b, and/or UAVs 102c to have them establish a direct data path between them much like establishing the direct paths illustrated in FIG. 2A. In this way, the UAVs can communicate with each other unrestricted by the distance between them.

Figure 2C:
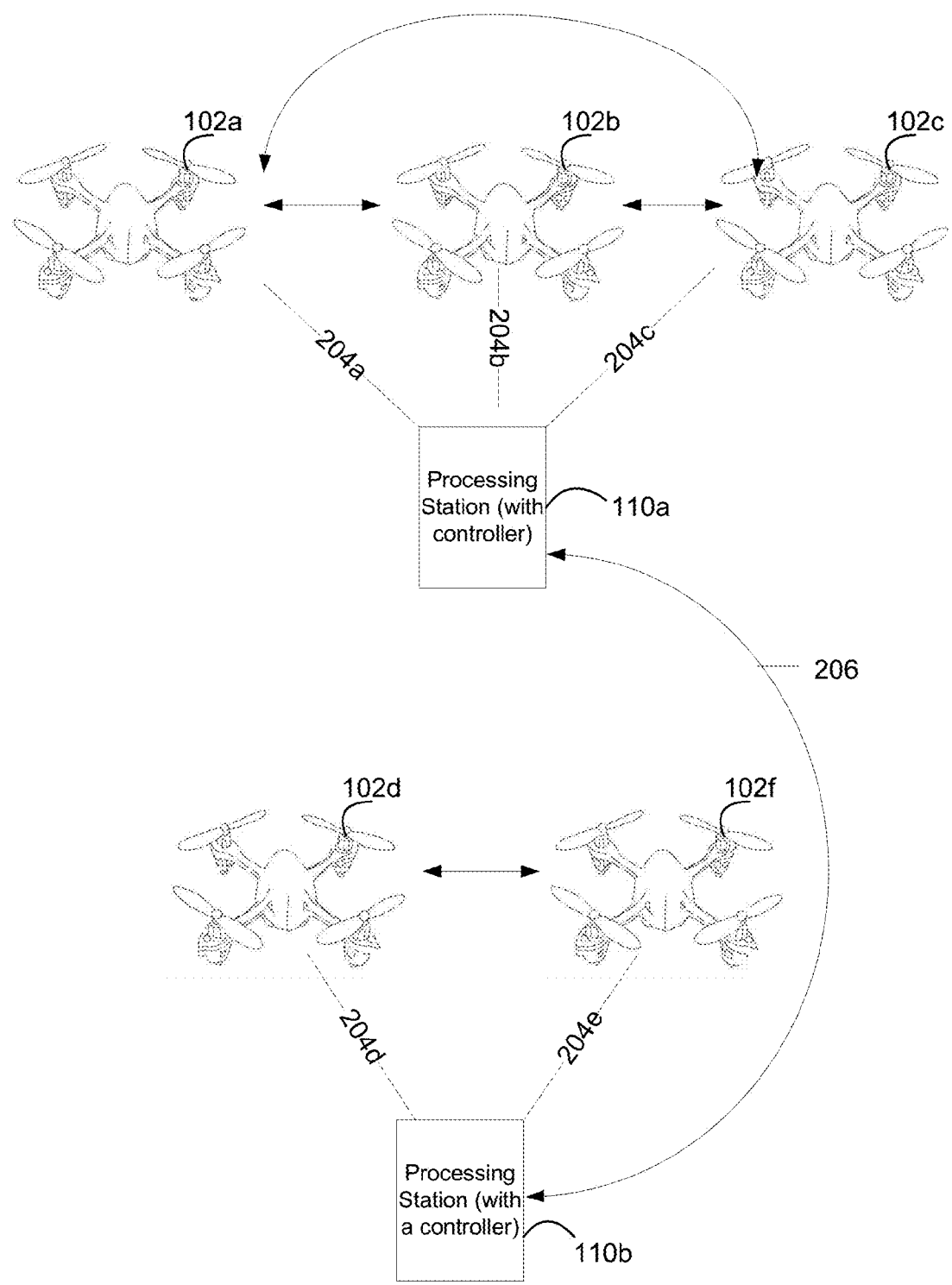
FIG. 2C illustrates a third example of communication channels established between UAVs in the network.

FIG. 2C illustrates another example for configuring network 100. In this example, control links 204a-c are established respectively between the processing station 110 and UAVs 102a, 102b and 102c. As shown, the processing station 110a in this example includes a controller. Similarly, control links 204d and 204e are established respectively between processing center 110b and UAVs 102d and 102f. As shown, a communication link 206 can be established between processing stations 110a and 110b. In this way, for example, a communication channel between UAV 102a and UAV 102*f* can be established through processing stations 110*a* and 110*b*. In certain embodiments, the controller in the processing center 110*a* or 110*b* can send control signals to UAVs 102, such as UAV 102*b*, 102*c*, and/or 102*d*, to request those UAVs to serve a router or relay point for the communication between UAV 102*a* and UAV 102*f*.

Returning to FIG. 1, one requirement of network 100 is availability. That is, for any suitable commercial application to be built upon network 100, network 100 needs to be highly available. As described above, individual UAVs 102 in the network is a node that can serve as a client, a relay point, a controller, an access point, a router, and/or any other network functionalities. As such, a given UAV 102 needs to be available in order for network 100 to function properly. Thus, air time for an individual UAV 102 in network 100 is crucial. In certain embodiments, a given UAV 102 in network 100 in accordance with the disclosure can stay in the air for days or even weeks before another UAV has to be sent to replace the given UAV. This will not only improve availability of the network, but also reduce the cost of operating the network.

This makes solar energy an attractive power source to conventional battery for a given UAV 102 in network 100. As used herein, solar energy may be referred to as solar power collected from solar irradiance by photovoltaic cells. The total amount of energy produced by the photovoltaic cells is typically a function of the geographical position (latitude, longitude, and altitude), time of the year, atmospheric absorption and efficiency of the photovoltaic cells. Generally, the cleaner the sky is, the larger the beam irradiation and the lower the relative fraction of the diffuse irradiation. For higher altitudes, the absorption is lower because of less radiation scattering by the atmosphere. In certain embodiments, the UAVs 102 in network 100 can fly above the ground at 50,000 to 65,000 feet and stay in the air for days, weeks, or even years. A few commercially available UAVs meet this criteria. For example, the Northrop Grumman RQ-4 Global Hawk flies at altitudes of up to 65,000 ft. and can remain aloft for up to 35 hours (3 days). Airbus Zephyr is another commercially available UAV that can meet this criteria. Zephyr is a relative small UAV with a wing span for about 70 feet. The current version of Zephyr is exclusively powered on solar energy and can fly above the weather at 65,000 feet for around two weeks.

Figure 3A:
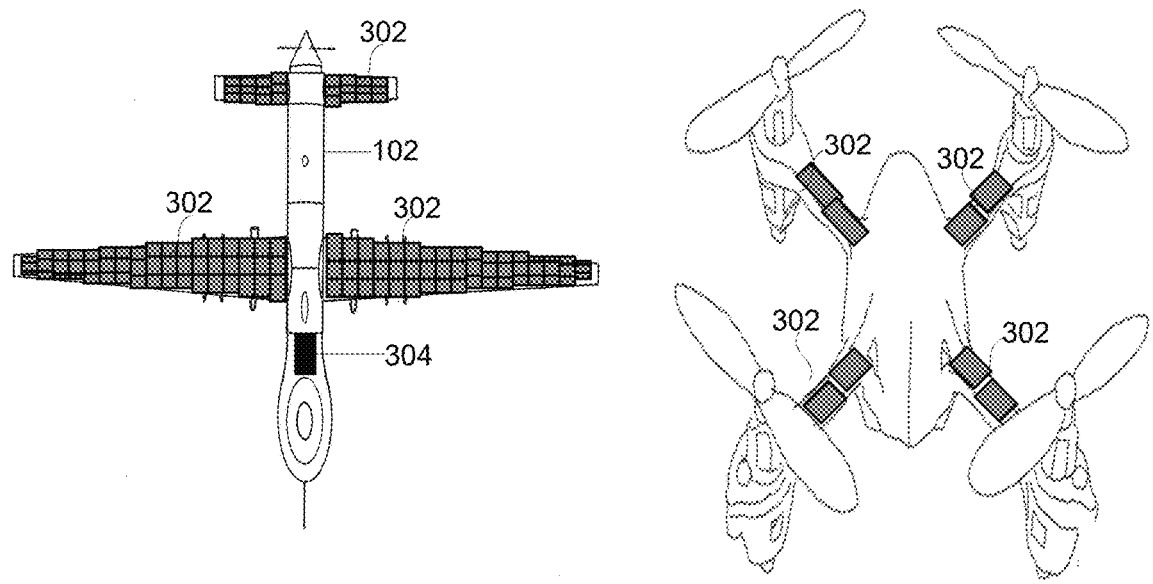
FIG. 3A illustrates two examples of an individual UAV in accordance with the disclosure.

FIG. 3A generally illustrates two examples of UAVs 102 in accordance with the disclosure. On the left side, illustrated is a UAV 102 that has two wings and capable of carrying payloads up to several kilograms. As shown, the UAV 102 on the left side can comprise photovoltaic cells 302 capable of absorbing solar irradiations and produce electricity. In this example, the photovoltaic cells 302 are evenly placed on both sides of wings and on the tail of the UAV 102 on the left side. The photovoltaic cells 302 can be made of any suitable materials. For example, the photovoltaic cells 302 can be made of thin film. The solar energy captured by the photovoltaic cells 302 can be converted to electricity to provide power to payloads carried by the UAV 102 and/or stored in one or more batteries (for example, lithium battery) onboard UAV 102. It should be understood this is merely illustrative. The placement photovoltaic cells 302 in other examples may not be limited to the two wings and/or the tail. For example, the photovoltaic cells 302 can be place on the body of the UAV 102. On the right side, there is shown another example of UAV 102, a quadcopter. As shown, the photovoltaic cells 302 can be placed on the arms of the quadcopter 102.

Figure 3B:
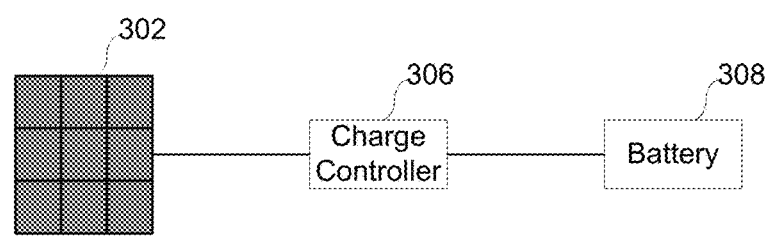
FIG. 3B illustrates an example of a solar system employed by the UAVs shown in 3A.

The solar system employed by UAV 102 in accordance with the disclosure can include a charge controller. This is illustrated in FIG. 3B. As shown, the photovoltaic cells 302 shown in FIG. 3A can be connected to a charge controller 306, which can be connected to a battery 308. The battery can be carried by the UAV 102 as part of payload, and can provide power to sustain function when solar energy is not available, for example at night. The solar energy provided by the photovoltaic cells 302 can be converted to electricity, for example, during the day and to provide power to various components in the payload directly. The electricity converted from the solar energy from the photovoltaic cells 302 can be stored in battery 308 through the charge controller 306. The charge controller 306 can be configured to control the charge to the battery 308 and to ensure the battery 308 is not overcharged. This can be done by diverting power away from the battery 308 once it is fully charged. In certain exemplary implementations, the charge controller 306 can incorporate a low-voltage disconnect function, which can prevent the battery 308 from being damaged by being completely discharged.

Returning to FIG. 1. As shown, an individual UAV 102 in network 100 can be configured to communicate with a ground processing station 110. This is also illustrated in FIG. 2C. As mentioned above, an important criteria to a UAV 102 in the network is altitude. However, as the UAV 102 altitude increases, the signals emitted by UAV 102 becomes weaker. A UAV 102 flying at an altitude of 65,000 feet can cover an area up to 100 kilometers on the ground, but the signal loss can be significantly higher than would occur for a terrestrial network. Radio signals typically requires a large amount of power for transmission in long distance. On the other end, the payloads can be carried by a UAV 102 that stays in the air for an extended period of time is limited. As mentioned above, solar energy can be used to power the UAV 102. However this limits the weight of payloads that can be carried by a UAV 102 due to the limited rate at which solar irritation can be absorbed and converted to electricity.

Free-space optical communication (FSO) is an optical communication technology that transmits light in free space to wirelessly transmit data for telecommunications. Commercially available FSO systems use wave length close to visible spectrum around 850 to 1550 nm. In a basis point-to-point FSO system, two FSO transceivers can be placed on both sides of transmission path that has unobstructed line-of-sight between the two FSO transceivers. A variety of light sources can be used for the transmission of data using FSO transceivers. For example, LED and laser can be used to transmit data in a FSO system.

Lasers used in FSO systems provide extremely high bandwidths and capacity, on par with terrestrial fiber optic networks, but they also consume much less power than microwave systems. Referring to FIG. 3A, as shown, the UAV 102 on the left side includes a FSO unit 304 placed at the fuselage body. The FSO unit 304 can include an optical transceiver with a laser transmitter and a receiver to provide full duplex bi-directional capability. The FSO unit 304 can use a high-power optical source, i.e., laser, and a lens to transmit the laser beam through the atmosphere to another lens receiving the information embodied in the laser beam. The receiving lens can connect to a high-sensitivity receiver via optical fiber. The FSO unit 304 can enable optical transmission at speeds up to 10 Gbps.

Figure 3C:
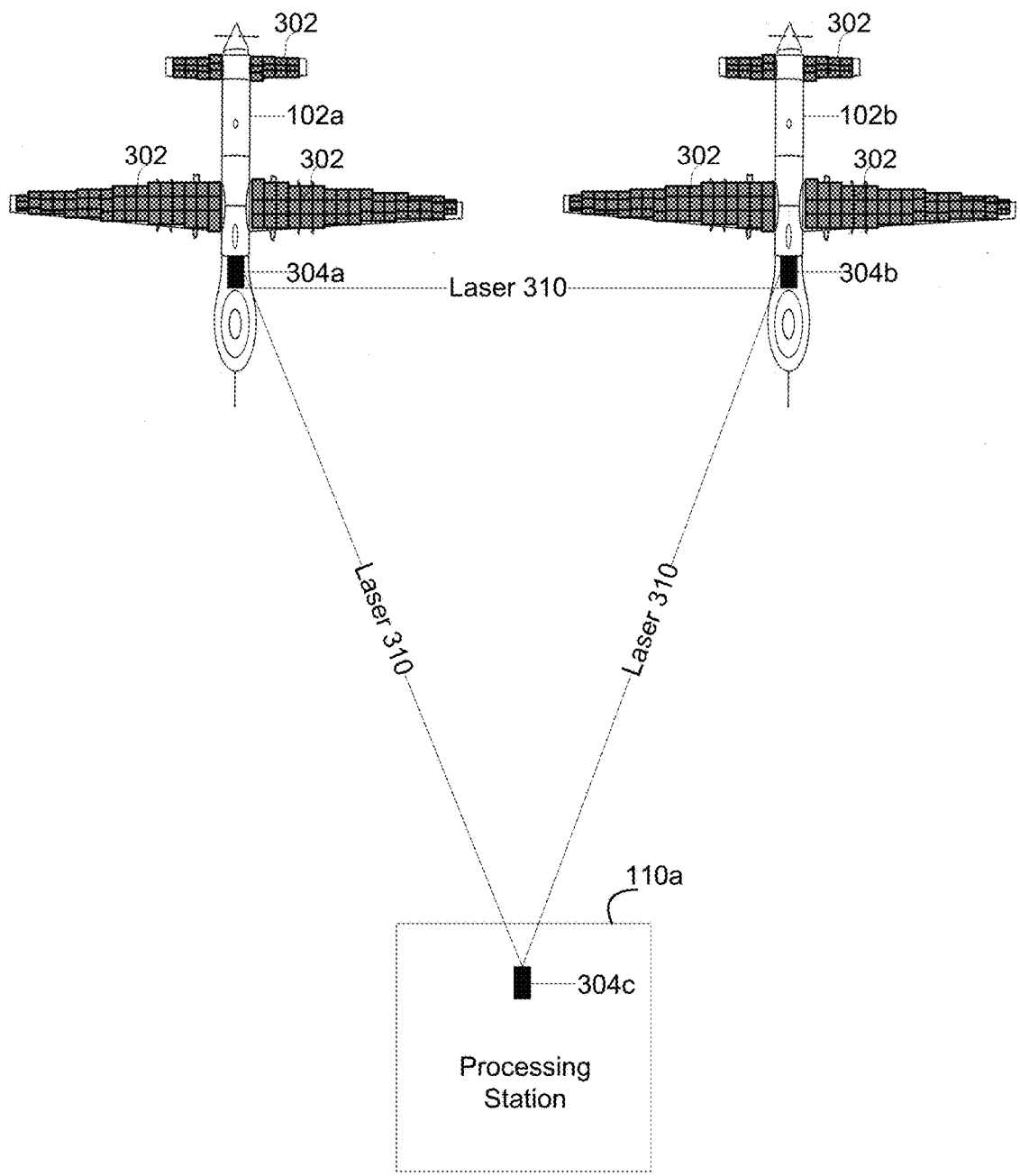
FIG. 3C an example of transmitting information through a FSO unit aboard a UAV in the network shown in FIG. 1.

FIG. 3C illustrates an example of transmitting information through FSO units 304 onboard UAVs 102 and in the processing station 110*a*. As shown, UAV 102*a* and UAV 102*b* in network 100 can each carry a FSO unit 304*a* and 304b respectively. In order for FSO unit 304a and 304b to communicate, there should be a line of sight (LoS) between UAVs 102a and 102b. The wavelength of the laser beam emitted by FSO unit 304a or 304b can be between 600 nm to 2000 nm. In order for UAVs 102a and 102b to maintain a clear LoS and "see" each other, various tracking technologies can employed. For example, in one embodiment, a satellite can be provided such that UAV 102a or 102b regularly reports its current geo-location to the satellite. In another example, the UAV 102a or 102b may employ high frequency radio transceiver onboard UAV 102 once awhile to report their current locations to each other. In any case, based on the geo-locations of both UAVs 102a and 102b, a link can be established between the FOS unit 304a and FOS unit 304b.

As also shown in FIG. 3C, a ground processing station 110a can include a FSO unit 304c configured to communicate with FSO unit 304a and/or FSO unit 304b. In certain embodiments, the FSO unit 304c can serve as an intermediary between UAV 102a and UAV 102b. For example, UAV 102a and/or 102b can be configured to communicate their geo-locations to FSO unit 304c on the ground. Since FSO unit 304 does not move, the geo-location of FSO 304c can be preconfigured into an onboard computers in UAVs 102a or 102b. Through the ground processing station 110, the UAVs 102a and 102b can acquire each other's geo-location, and align the FSO units 304a and 304b based on the geo-locations. In implementations, FSO unit 304a or 304b can have more than one optical transceiver. For example, FSO unit 304a or 304b can have one FSO transceiver aligned with an FSO transceiver in the FSO unit 304c; and another FSO transceiver aligned with each other. In certain embodiments, FSO unit 304a or 304b can have multiple FSO transceivers aligned with other optical transceivers onboard multiple other UAVs 102, such as UAV 102c, 102d, or 102e.

Figure 4:
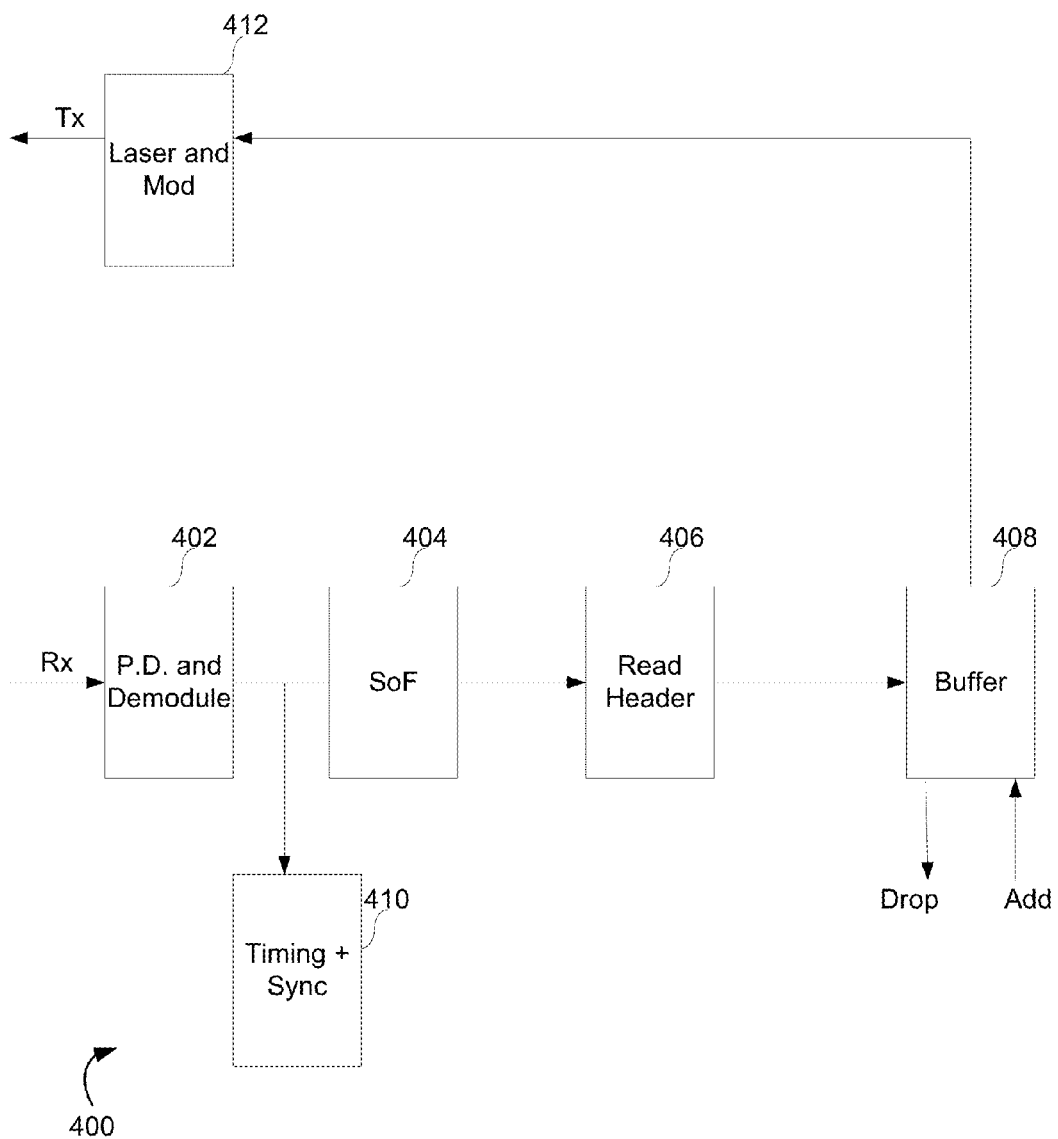
FIG. 4 illustrates a block diagram showing one exemplary architecture for a FSO transceiver that can be included in a FSO unit shown in FIG. 3C.

Once the FSO units 304a and 304b are aligned with each other, optical data can be detected. FIG. 4 illustrates a block diagram showing one exemplary architecture for a FSO transceiver 400 that can be included in a FSO unit 304. As shown, the optical data can be received at photodetector-demodulator 402, which can be configured to convert optical data to digital data (e.g., binary) through the aid of a clock provided by the timing and synchronization component 410. The SoF component 404 can be configured to find the start of frame or packet from the digital data stream output by the photodetector and demodulator 402. In this way, the digital data can be packetized or framed. The read-header component 406 can be configured to read the header of each frame and determine various information from the header, such as, the type of the packet, the length of the packet, an error control code for the packet and/or any other information. As still shown, data formatted according to the header can then be stored in the buffer 408 for use by other components and new data can be added in the buffer 408 for transmission through the laser and modulator component 412.

Figure 5:
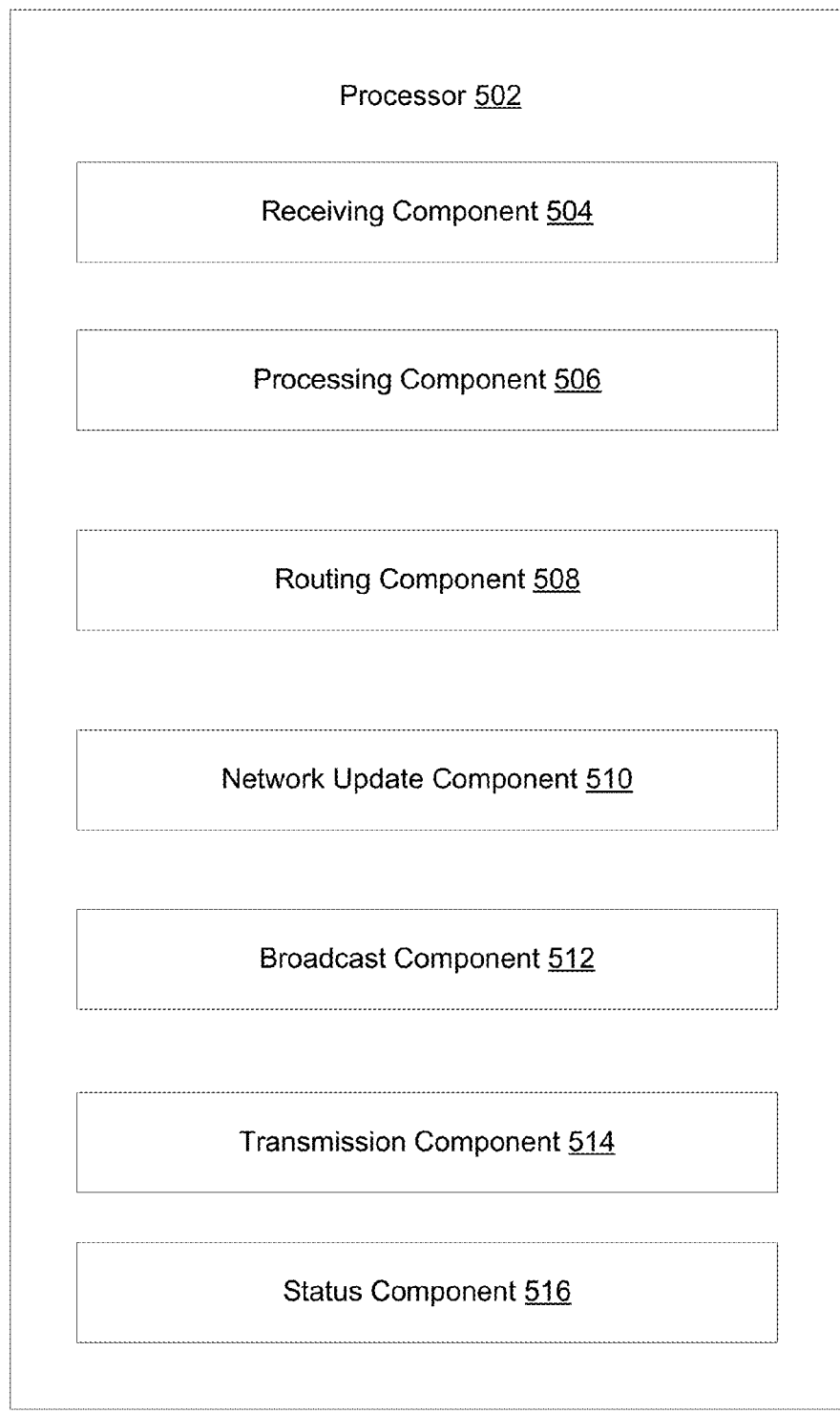
FIG. 5 illustrates an example of system for facilitating UAV network 100 in accordance with the disclosure.

FIG. 5 illustrates an example of system 500 for facilitating UAV network 100 in accordance with the disclosure. As shown, system 500 can comprise one or more of a processor 502 configured to implement programmed components. In some implementations, system 500 can be implemented within the payloads carried by a UAV 102 in network 100. In some implementations, system 500 can be implemented through one or more servers located in a ground processing center 110. In any case, as shown, the programmed components implemented by processor 502 can include a receiving component 504, a processing component 506, a routing component 508, a network update component 510, a broadcast component 512, a transmission component 514, a status component 516, and/or any other components.

The receiving component 504 can be configured to retrieve information received from the FSO unit 304. In certain implementations, the receiving component 504 can retrieve information stored in buffer 408 shown in FIG. 4. In certain embodiments, the receiving component 504 can be configured to read a destination address of the information and determine if it (the UAV or processing station) is the destination for the information. In the case where it determines that it is the destination for the information, it sends a control signal to the processing component 506 for further processing the information. In the case when it determines that it is not the destination for the information, it sends a control signal to the routing component 508 so that the routing component 508 can router the information to the destination of the information.

The processing component 506 can be configured to process the information received from the FSO unit 304. The processing by the processing component 506 can include formatting the information into proper data structures and make them available for an application that relies on the processing component 506. For example, the incoming information can compressed navigation control data. In that example, the processing component 506 can be configured to un-compress the navigation control data, generate one or more navigation control commands based on or from the uncompressed data, effectuate execution of the control commands, and/or any other operations.

The routing component 508 can be configured to router information to another UAV 102 and/or a processing station. The routing component 508 may retrieve a routing table from storage associated with the process 502 to perform the routing. The routing table can specify one or more other UAVs 102 that can be established communication channel with. For example, the routing table may specify for any information whose destination is a particular UAV 102 or a group of UAVs 102, that information should be forwarded to the particular UAV 102. In implementations, the routing component 508 can instruct the FSO unit 304 to transmit the information to the FSO unit 304 of the particular UAV 102.

The network update component 510 can be configured to update network 100's configuration so that the routing table can be updated. For example, a node or a particular UAV 102 may be off the air and thus become unavailable. In that case, the ground processing station 110 connected with UAV 102 can transmit a network update to inform the UAV 102 of such change. After receiving the network update, the network update component 510 can be configured to update the routing table to remove an entry that says the particular UAV 102 is available for transmission. As another example, a node or a particular UAV 102 may be launched to cover an additional area on the ground. In that case, the ground processing station can send a network update informing the UAV 102 of this change. After receiving the update, the network update component 510 can update the routing table to add an entry that says the particular UAV 102 is available.

The broadcast component 512 can be configured to broadcast UAV 102's geo-location and availability to other UAVs 102 in the network 100. The broadcast message sent by the broadcast component 512 can be used by any receiving UAV 102 as an instruction to establish a communication link with the UAV 102, for example through a radio transceiver onboard UAV 102. The transmission component 514 can be configured to transmit information to another UAV through FSO unit 304, a high frequency radio transceiver, and/or any other communication hardware aboard UAV 102. The status component 516 can be configured to transmit status of the UAV 102 to a ground processing station 110 connected with the UAV 102. Examples of the statuses that can be transmitted by the status component 516 can include a status indicating a load of the UAV 102 (e.g., 50% busy, 80% processing power is used and so on), a status indicating the UAV 102 is available to receive any information (e.g., due to power outage or malfunction of FSO unit 304), a status indicating UAV 102 fly time since launch, a status indicating a weather condition the UAV 102 is flying under, and/or any other statuses.

Figure 6:
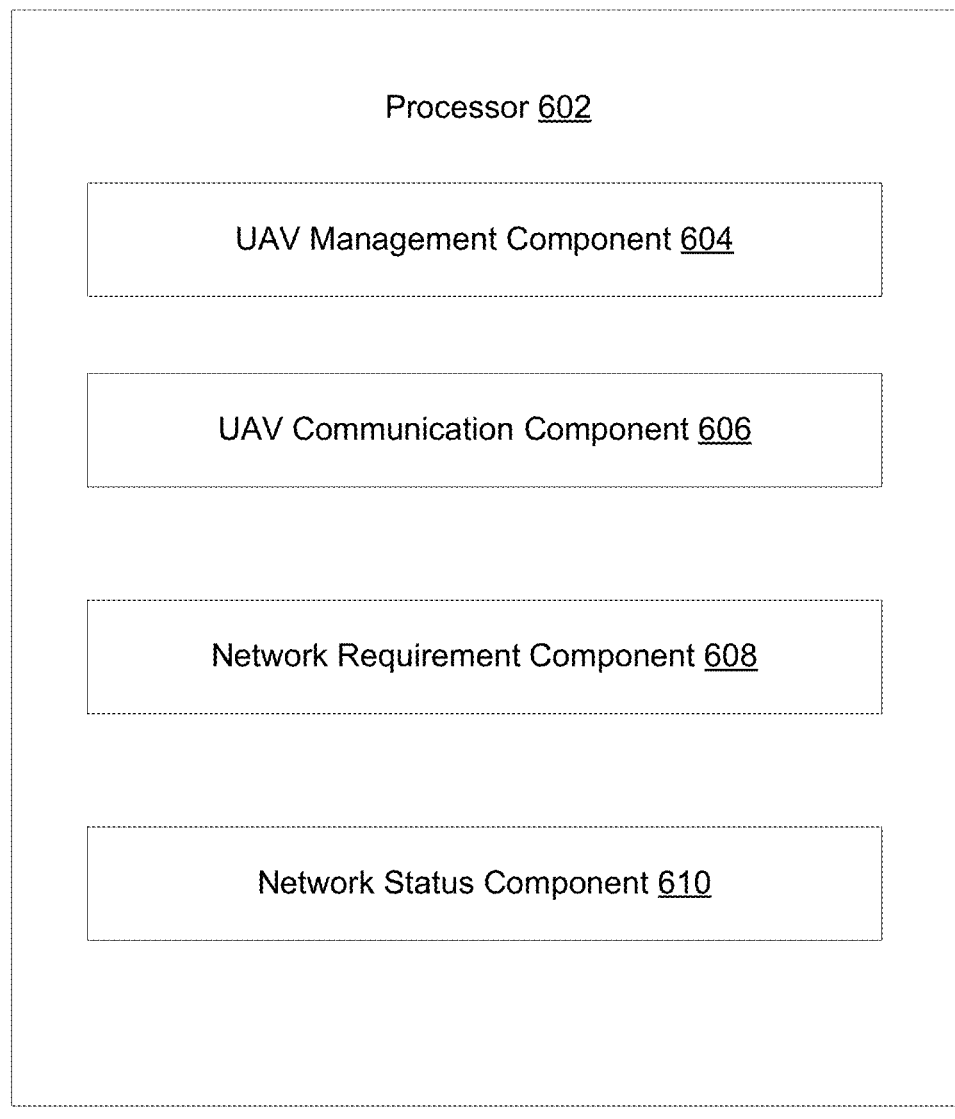
FIG. 6 illustrates an example of a controller for facilitating UAV network in accordance with the disclosure.

FIG. 6 illustrates an example of a controller 600 for facilitating UAV network 100 in accordance with the disclosure. As described above, in certain embodiments, controller 600 can be provided in a ground processing station 110 shown in FIG. 1, and in certain embodiments, controller 600 can be provided in a UAV 102 in network 100. For example, without limitation, a UAV 102 in the network 100 can be a balloon carrying hundreds of pounds of payload. In that example, the controller 600 can be provided in the balloon. In any case, as shown, the controller 600 can include one or more of a processor 602 configured to implement programmed components. The programmed components can include a UAV management component 604, a UAV communication component 606, a network requirement component 608, a network status component 610, and/or any other components.

The UAV management component 604 can be configured to manage UAVs 102 in the network 102. Management of UAVs 102 by the UAV management component 604 can include maintaining an inventory of UAVs currently in the air. The inventory may include information indicating a launch time for a particular UAV 102 in the air, a last known geo-location of the UAV 102, one or more events related to the particular UAV 102, an area covered by the particular UAV 102, and/or any other information related to the particular UAV 102. In certain embodiments, management of UAVs 102 by the UAV management component 604 can include keep tracking of connections among UAVs 102 and provide a "picture" of topology for network 100 at a given point of time upon request.

The UAV communication component 606 can be configured to communicate with an individual UAV 102. The communication by the communication component 606 by the UAV communication component 606 can be achieved through a FOS unit 304 associated with the controller 600. The UAV communication component 606 can provide communication functionalities for other components in the controller 600 as well as other applications. For example, the UAV management component 604 can employ the UAV communication component 604 to communicate with individual UAVs 102 to acquire their connections with other UAVs 102 in network 102. In implementations, the UAV communication component 606 can be configured to perform a handshake with a particular UAV 102 to establish a communication channel with the particular UAV 102, to perform error control for the communication between controller 600 and the UAV 102, and/or to perform any other operations.

The network requirement component 608 can be configured to receive network requirements from an administrator of network 100 or from an application. For example, an administrator of network 100 may be enabled through a graphical user interface to connect two UAVs 102 so that a communication link may between the two UAVs can be established. In that example, the network requirement component 608 can receive the connection requirement and send an instruction via the UAV communication component 606 to one or both of the UAVs 102 to have them establish a communication link accordingly. As another example, an application such as a video conferencing application can send a request to the network requirement component 608 to require certain UAV 102 to be a downlink for another UAV 102 in receiving video data stream. In that example, the network requirement component 608 can validate such as request, and upon a validation, send a request to the certain UAV 102 to have it serve as the downlink for another UAV 102 accordingly.

The network status component 610 can be configured to obtain a status from an individual UAV 102. Examples of the statuses that can be obtained by the network status component 610 can include a status indicating a load of the UAV 102 (e.g., 50% busy, 80% processing power is used and so on), a status indicating the UAV 102 is available to receive any information (e.g., due to power outage or malfunction of FSO unit 304), a status indicating UAV 102 fly time since launch, a status indicating a weather condition the UAV 102 is flying under, and/or any other statuses.

Figure 7:
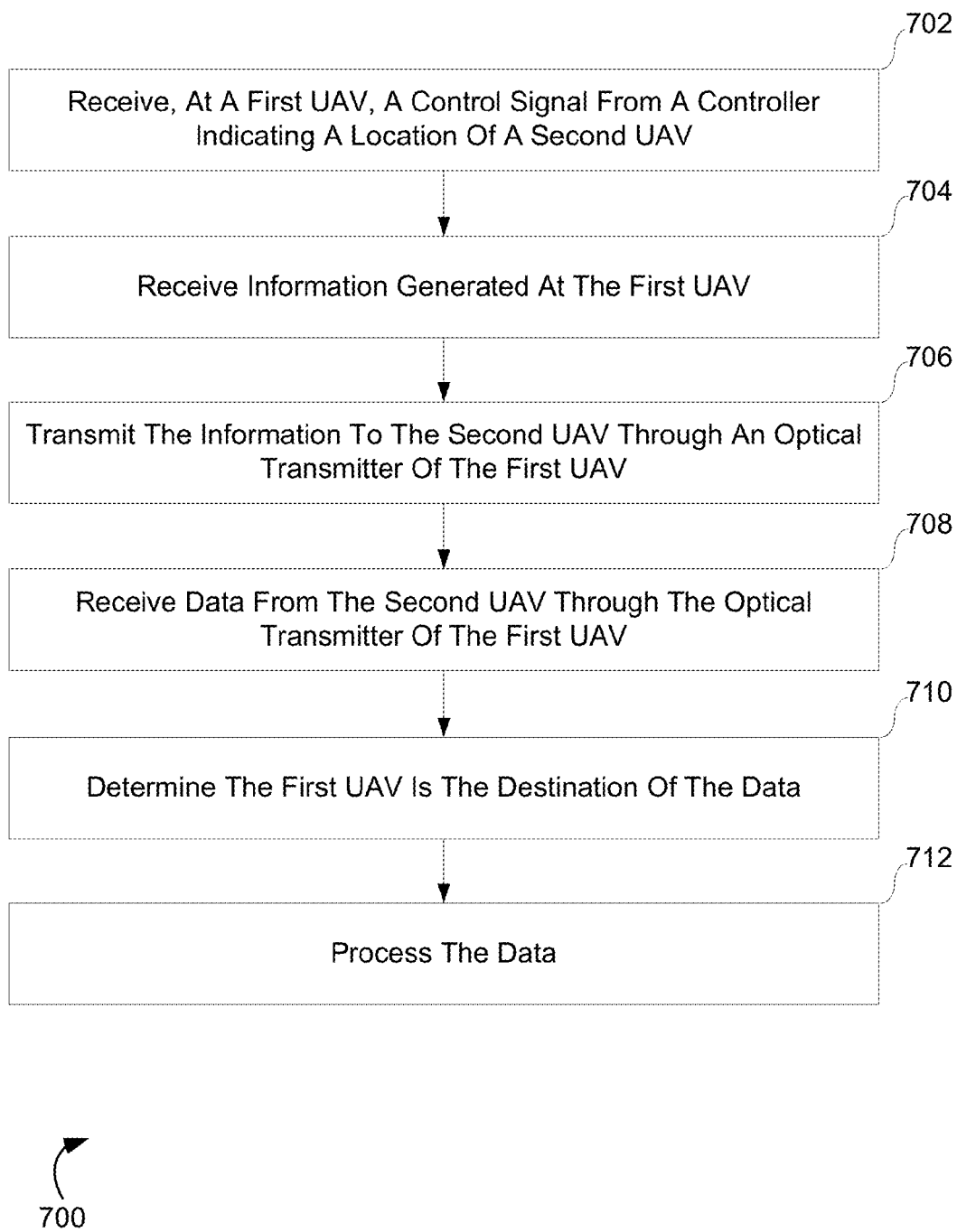
FIG. 7 illustrates one exemplary method for facilitating a UAV network in accordance with the disclosure.

FIG. 7 illustrates one exemplary method for facilitating a UAV network in accordance with the disclosure. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At 702, a control signal can be received form a controller at a first UAV. The control signal received at 702 can indicate a location of a second UAV. In some implementations, operation 702 can be performed by a network update component the same as or substantially similar to network update component 510 described and illustrated herein.

At 704, information generated at the first UAV can be received. In some implementations, operation 704 can be performed by a receiving component the same as or substantially similar to receiving component 504 described and illustrated herein.

At 706, information received at 704 can be transmitted to the second UAV through an optical transmitter of the first UAV. In some implementations, operation 704 can be performed by a transmission component the same as or substantially similar to transmission component 514 described and illustrated herein.

At 708, data can be received from the second UAV through the optical transmitter of the first UAV. In some implementations, operation 708 can be performed by a receiving component the same as or substantially similar to receiving component 504 described and illustrated herein.

At 710, it can be determined that the first UAV is the destination of the data received at 708. In some implementations, operation 710 can be performed by a receiving component the same as or substantially similar to receiving component 504 described and illustrated herein.

At 712, the data received at 708 can be processed. In some implementations, operation 712 can be performed by a processing component the same as or substantially similar to processing component 506 described and illustrated herein.

Figure 8:
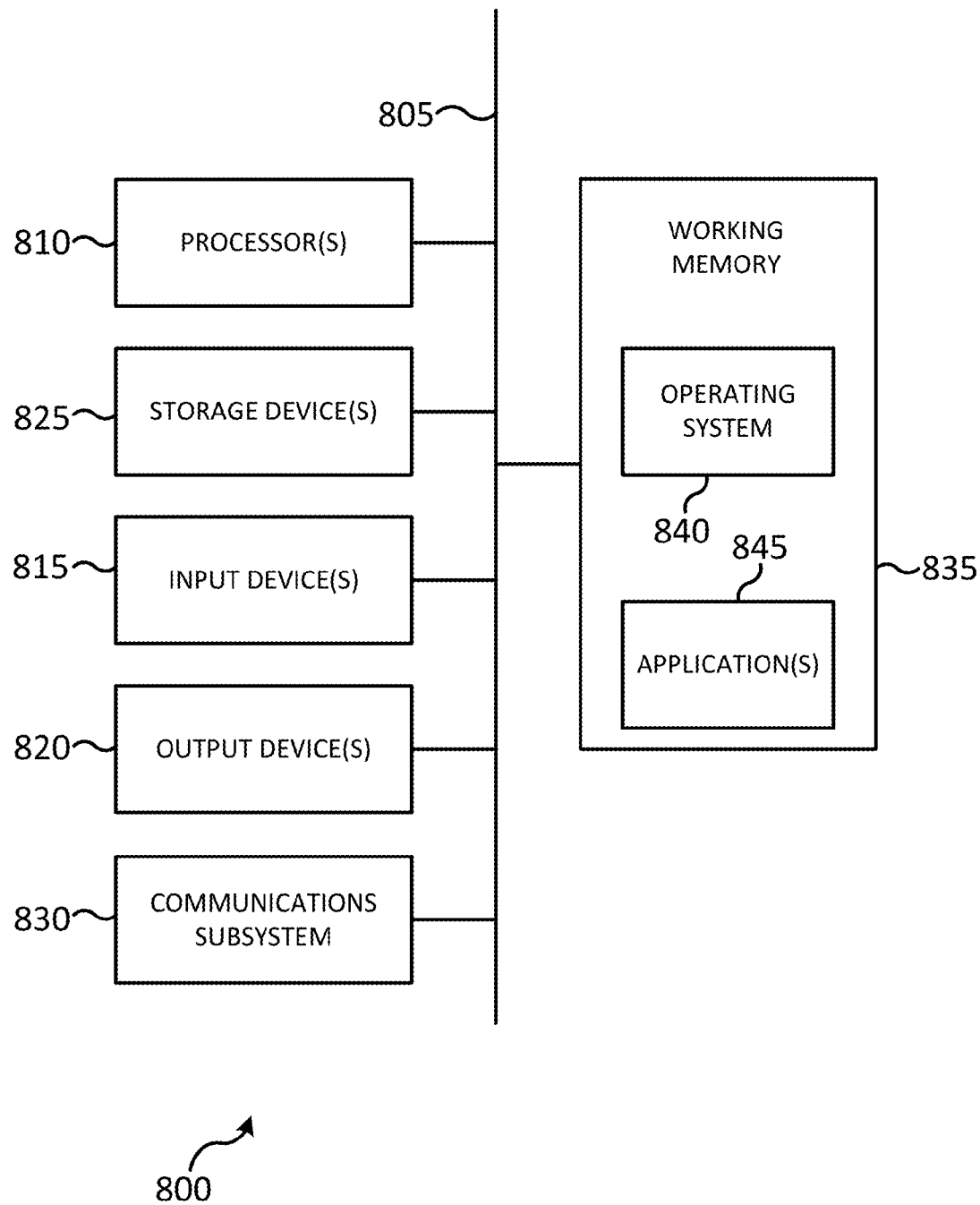
FIG. 8 illustrates a simplified computer system, according to an exemplary embodiment of the present disclosure.

FIG. 8 illustrates a simplified computer system, according to an exemplary embodiment of the present disclosure. A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for facilitating an unmanned aerial vehicle network comprising ground controllers, the ground controllers including a first ground controller and a second ground controller, the method being implemented in one or more of a processor configured to execute programmed components, the method comprising:

broadcasting, at a first unmanned aerial vehicle, a geo-location and availability of the first unmanned aerial vehicle to any unmanned aerial vehicle as an instruction for a receiving unmanned vehicle to establish a communication with the first unmanned vehicle;

receiving, at the first unmanned aerial vehicle, a broadcast message from a second unmanned aerial vehicle, the broadcast message indicating a geo-location and availability of the second unmanned aerial vehicle;

based on the geo-location and availability of the second unmanned aerial vehicle, establishing, at the first unmanned aerial vehicle, a communication channel with the second unmanned aerial vehicle;

storing, at the first unmanned aerial vehicle, the geo-location of the second unmanned aerial vehicle in in a routing table, the routing table being stored in storage included in the first unmanned aerial vehicle;

receiving, at the second ground controller, an instruction to establish a communication between a third unmanned aerial vehicle and a second unmanned aerial vehicle, wherein the third and second unmanned aerial vehicles are controlled by different ground controllers;

in response to receiving the instruction, sending, at the second ground controller, to the third unmanned aerial vehicle, a request for data transmission to the second unmanned aerial vehicle;

in response to receiving the request, transmitting, at the third unmanned aerial vehicle, digital data to be transmitted to the second unmanned aerial vehicle directly to a second ground controller;

receiving, at the second ground controller, from the third unmanned aerial vehicle, the digital data to be transmitted to the second unmanned aerial vehicle;

transmitting, at the second ground controller, the digital data directly to the first ground controller;

transmitting, at the first ground controller, the digital data to the first unmanned aerial vehicle;

receiving, at the first unmanned aerial vehicle, the digital data from the first ground controller, determining, at the first unmanned aerial vehicle, the destination of the digital data is the second unmanned aerial vehicle;

retrieving, at the first unmanned aerial vehicle, from the storage the routing table and determining from the routing table the geo-location of the second unmanned aerial vehicle;

transmitting the digital data to the second the second unmanned aerial vehicle based on the geo-location of the second unmanned aerial vehicle.

2. The method of claim 1, further comprising receiving, at the first unmanned aerial vehicle, control signals from a controller, wherein the control signals received from the controller includes a signal indicating a network status of the unmanned aerial vehicle network.

3. The method of claim 2, further comprising:
updating, at the first unmanned aerial vehicle, the routing table based on the network status.

4. The method of claim 2, wherein the network status indicates that the second unmanned aerial vehicle is unavailable.

5. The method of claim 2, further comprising:
transmitting, at the first unmanned aerial vehicle, to the controller status information indicating the first unmanned aerial vehicle is unavailable.

6. The method of claim 1, wherein the digital data is not a navigation command.

7. The method of claim 1, further comprising transmitting, at the first unmanned aerial vehicle, a control signal to a controller indicating the first unmanned aerial vehicle is unavailable.

8. The method of claim 7, wherein the controller is provided by a ground processing station or another unmanned aerial vehicle.

9. A system for facilitating an unmanned aerial vehicle network comprising ground controllers, the ground controllers including a first ground controller and a second ground controller, the system comprising one or more of a processor configured by machine readable-instructions to perform:

broadcasting a geo-location and availability of the first unmanned aerial vehicle to any unmanned aerial vehicle as an instruction for a receiving unmanned vehicle to establish a communication with the first unmanned vehicle;

receiving, at the first unmanned aerial vehicle, a broadcast message from a second unmanned aerial vehicle, the broadcast message indicating a geo-location and availability of the second unmanned aerial vehicle;

based on the geo-location and availability of the second unmanned aerial vehicle, establishing, at the first unmanned aerial vehicle, a communication channel with the second unmanned aerial vehicle;

storing, at the first unmanned aerial vehicle the geo-location of the second unmanned aerial vehicle in in a routing table, the routing table being stored in storage associated with the processor;

receiving, at the second ground controller, an instruction to establish a communication between a third unmanned aerial vehicle and a second unmanned aerial vehicle, wherein the third and second unmanned aerial vehicles are controlled by different ground controllers;

in response to receiving the instruction, sending, at the second ground controller, to the third unmanned aerial vehicle, a request for data transmission to the second unmanned aerial vehicle;

in response to receiving the request, transmitting, at the third unmanned aerial vehicle, digital data to be transmitted to the second unmanned aerial vehicle directly to a second ground controller;

receiving, at the second ground controller, from the third unmanned aerial vehicle, the digital data to be transmitted to the second unmanned aerial vehicle;

transmitting, at the second ground controller, the digital data directly to the first ground controller;

transmitting, at the first ground controller, the digital data to the first unmanned aerial vehicle;

receiving, at the first unmanned aerial vehicle, digital data from the first ground controller, digital data being first transmitted by a third unmanned aerial vehicle directly to a second ground controller then being transmitted from the second ground controller directly to the first ground controller;

determining, at the first unmanned aerial vehicle, the destination of the digital data is the second unmanned aerial vehicle;

retrieving, at the first unmanned aerial vehicle, from the storage the routing table and determining from the routing table the geo-location of the second unmanned aerial vehicle; and transmitting the digital data to the second unmanned aerial vehicle based on the geo-location of the second unmanned aerial vehicle.

10. The system of claim 9, wherein the processor is further configured to perform: receiving, at the first unmanned aerial vehicle, control signals from a controller, wherein the control signals received from the controller includes a signal indicating a network status of the unmanned aerial vehicle network.

11. The system of claim 10, the processor is further configured to perform:
updating, at the first unmanned aerial vehicle, a routing table based on the network status.

12. The system of claim 10, wherein the network status indicates that the second unmanned aerial vehicle is unavailable.

13. The system of claim 12, further comprising:
transmitting, at the first unmanned aerial vehicle, to the controller status information indicating the first unmanned aerial vehicle is unavailable.

14. The system of claim 9, wherein the digital data is not a navigation command.

15. The system of claim 9, further comprising transmitting, at the first unmanned aerial vehicle, a control signal to a controller indicating the first unmanned aerial vehicle is unavailable.

16. The system of claim 9, wherein the controller is provided by a ground processing station or another unmanned aerial vehicle.

\* \* \* \* \*